(12) United States Patent
Mair

(10) Patent No.: US 8,201,745 B2
(45) Date of Patent: Jun. 19, 2012

(54) TRANSPONDER DETECTION BY RESONANCE FREQUENCY REDUCTION

(75) Inventor: Richard Mair, Kapfenberg (AT)

(73) Assignee: NXP B.V., Eindhoven (NL)

( * ) Notice: Subject to any disclaimer, the term of this patent is extended or adjusted under 35 U.S.C. 154(b) by 83 days.

(21) Appl. No.: 12/811,300

(22) PCT Filed: Jan. 5, 2009

(86) PCT No.: PCT/EP2009/000016
§ 371 (c)(1),
(2), (4) Date: Jun. 30, 2010

(87) PCT Pub. No.: WO2009/083604
PCT Pub. Date: Jul. 9, 2009

(65) Prior Publication Data
US 2010/0282849 A1   Nov. 11, 2010

(30) Foreign Application Priority Data

Jan. 3, 2008 (EP) .................................... 08000072
Jan. 5, 2009 (WO) ................. PCT/EP2009/000016

(51) Int. Cl.
*G06K 19/06* (2006.01)

(52) U.S. Cl. .......................... 235/491; 235/436; 235/439
(58) Field of Classification Search .................. 235/436, 235/439, 491
See application file for complete search history.

(56) References Cited

U.S. PATENT DOCUMENTS

| | | | |
|---|---|---|---|
| 6,232,878 B1 * | 5/2001 | Rubin | 340/572.1 |
| 6,834,251 B1 * | 12/2004 | Fletcher | 702/150 |
| 2003/0027148 A1 | 2/2003 | Beuhler et al. | |
| 2004/0212549 A1 | 10/2004 | Fletcher et al. | |
| 2005/0156752 A1 * | 7/2005 | Finkenzeller et al. | 340/693.3 |
| 2006/0170553 A1 | 8/2006 | Bierach | |
| 2008/0238621 A1 * | 10/2008 | Rofougaran et al. | 340/10.1 |

* cited by examiner

Primary Examiner — Kristy A Haupt

(57) ABSTRACT

A reader device for detecting the presence of a transponder within an operating distance of the reader device, the reader device comprising a resonant circuit adapted for generating an electromagnetic field having a frequency distribution around a resonance frequency, and a transponder detection unit adapted for detecting the presence of the transponder within the operating distance of the reader device by a shift of the resonance frequency of the resonant circuit in the presence of the transponder within the operating distance of the reader device.

15 Claims, 4 Drawing Sheets

TRANSPONDER DETECTION BY RESONANCE FREQUENCY REDUCTION

The invention relates to a reader device for detecting the presence of a transponder.

Moreover, the invention relates to a method of detecting the presence of a transponder.

Furthermore, the invention relates to a communication system.

Beyond this, the invention relates to a program element.

The invention further relates to a computer-readable medium.

In the field of automated identification of people and goods, RFID technology is proceeding with great leaps forward. Near field communication (NFC) is a RFID derivate that is used to communicate by touching another device. Active RFID transponders (reader/writer devices) for NFC applications are basically built up like common RFID readers. They are emitting a magnetic field that can be used to power passive RFID transponders (tags). The physical layer differs primarily in the emitted magnetic field strength. Near field communication operates in close proximity and has usually a weaker magnetic field.

The standard method to detect passive NFC devices relies on protocol communication. The initiator periodically sends out inquiry requests and waits for passive targets to respond. In this situation one expects to detect at most one tag at a time, so it is best energy-wise to use a single time slot. Since the targets are passive, the initiator has to provide the energy for the target by maintaining the magnetic field for the whole communication sequence lasting at least 5 ms.

A shortcoming of the conventional NFC technology is thus that the power consumption for detecting a transponder may be very high.

It is an object of the invention to provide a transponder detection system having a sufficiently small power consumption.

In order to achieve the object defined above, a reader device for detecting the presence of a transponder, a communication system, a method of detecting the presence of a transponder, a program element, and a computer-readable medium according to the independent claims are provided.

According to an exemplary embodiment of the invention, a reader device for detecting the presence of a transponder within an operating distance (i.e. a spatial region within which the reader device may communicate with a transponder) of the reader device is provided, the reader device comprising a resonant circuit (for instance an electromagnetic resonant circuit) adapted for generating an electromagnetic field having a frequency distribution around a resonance frequency (for instance having a frequency distribution symmetric around a resonance frequency, particularly having a maximum at the resonance frequency), and a transponder detection unit adapted for detecting the presence of the transponder within the operating distance of the reader device by a shift (particularly by a downward shift (i.e. a shift towards a smaller resonance frequency), but alternatively also an upward shift can be detected) of the resonance frequency of the resonant circuit in the presence of the transponder within the operating distance of the reader device.

According to another exemplary embodiment of the invention, a communication system (for instance an NFC communication system) is provided comprising a reader device having the above mentioned features and adapted for detecting the presence of a transponder within an operating distance of the reader device, and a transponder arranged or arrangeable within the operating distance of the reader device.

According to still another exemplary embodiment of the invention, a method of detecting the presence of a transponder (particularly within an operating distance of a reader device) is provided, the method comprising generating an electromagnetic field (particularly by a resonant circuit) having a frequency distribution around a resonance frequency, and detecting the presence of the transponder (particularly within the operating distance of the reader device) by a shift (particularly by a downward shift) of the resonance frequency (particularly of the resonant circuit) in the presence of the transponder (particularly within the operating distance of the reader device).

According to still another exemplary embodiment of the invention, a program element (for instance a software routine, in source code or in executable code) is provided, which, when being executed by a processor (such as a microprocessor or a CPU), is adapted to control or carry out a method having the above mentioned features.

According to yet another exemplary embodiment of the invention, a computer-readable medium (for instance a CD, a DVD, a USB stick, a floppy disk or a harddisk) is provided, in which a computer program is stored which, when being executed by a processor (such as a microprocessor or a CPU), is adapted to control or carry out a method having the above mentioned features.

Data processing which may be performed according to embodiments of the invention can be realized by a computer program, that is by software, or by using one or more special electronic optimization circuits, that is in hardware, or in hybrid form, that is by means of software components and hardware components.

According to an exemplary embodiment of the invention, detection of a transponder may be performed based on a determination of a shift of a resonance frequency of a resonant circuit of a reader device to a lower value (or to a higher value) so that the presence of a transponder can be securely distinguished from the presence of any metal pieces which may result in an upward shift of a resonance frequency. Therefore, without the necessity of decoding any signal received from the transceiver and therefore in a fast and energy-efficient manner, the presence of one or more transponders can be detected accurately by embodiments of the invention.

It may be preferred to detect a downward shift of the resonance frequency since this may allow to unambiguously distinguish the presence of a tag from the presence of, for instance, metal pieces. However, for instance in the case of specific correlations between the resonance frequencies of tag and resonant circuit, the presence of a tag may also result in an upward shift of the resonance frequency to be detected. In such a scenario, it is possible to verify the presumption that a tag is present by, for example, performing a protocol analysis as a complementary detection method.

Like many other wireless interfaces found in mobile equipment, near field communication consumes rather much energy, even just for scanning the vicinity to find communication partners. Consequently, many users tend to turn off these features when they are not used. Exemplary embodiments of the invention make the use of NFC devices more convenient by introducing a low power (and still fast) neighborhood detection method to find passive devices. Tag detection may determine whether a passive RFID transponder is present somewhere within range of the reader/writer device. Near field communication may be integrated into handheld devices, which are carried on the users body. To keep false positives small, the tag detection procedure according to an exemplary embodiment of the invention may discriminate between passive tags on the one hand and typical content of pockets and bags like keys and other metal objects on the other hand due to a different characteristic influence of such element on the resonance frequency of a reader/writer device as compared to a corresponding influence of a transponder.

In the following, further exemplary embodiments of the reader device will be explained. However, these embodiments also apply to the method, to the communication system, to the computer-readable medium and to the program element.

The transponder detection unit may be adapted for determining the absence of a transponder within the operating distance of the reader device by an upward shift of the resonance frequency of the resonant circuit in the presence of a metal object within the operating distance of the reader device. The inventors have recognized that the presence of a metal object in an electromagnetic field generated by a reader device results in an upward shift of the resonance frequency of a resonant circuit of the reader device. Thus, the presence of a metal piece resulting in an upward shift of the resonance frequency can be securely distinguished from a downward shift which is an indication of the presence of a transponder. The presence of an upward shift may, under certain circumferences, allow to rule out the presence of a transponder in the active region of a reader device.

The transponder detection unit may be adapted for determining a distance (or for determining any other quantitative parameter or information regarding a relative positioning between transponder and reader device) between the transponder and the reader device by evaluating a quantity (for instance an absolute (in Hz) or relative (in %) value of the frequency shift) of the downward shift of the resonance frequency. Since, depending on a distance between the transponder and the reader device, the quantity of the downward shift of the resonance frequency of the resonant circuit may be changed, the amount of the reduction may allow to derive quantitative distance information in addition of the qualitative information regarding the presence/absence of a tag. For instance, a characteristic curve (see FIG. 2, for example) can be stored in the system which characteristic curve may allow to determine a distance from the knowledge of a frequency shift or from a time-dependence of a frequency shift. Such a characteristic curve may be stored as a formula or as a lookup table.

The resonant circuit may be adapted for generating the electromagnetic field having a frequency distribution (which may be any distribution such as a Gaussian, a Lorentzian, or a combination thereof) around a resonance frequency which is smaller than a resonance frequency of a transponder to be detected. For example, the default resonance frequency of the resonant circuit may be 13.56 MHz, whereas the resonance frequency of a transponder may be around 14 MHz. In such a configuration, the correlation between presence of the transponder and frequency shift is particularly pronounced. It is possible that a (for instance standardized) pre-known value of a resonance frequency is stored in the system. This information may be included by a processor of the reader device to derive or refine transponder presence/absence information.

The resonant circuit may be adapted for generating the electromagnetic field having a frequency distribution around a resonance frequency which is 13.56 MHz. This frequency is typical for Near Field Communication where embodiments of the invention may be applied particularly advantageously.

The transponder detection unit may be adapted for detecting the presence of the transponder without performing protocol decoding. Therefore, it may be dispensable according to exemplary embodiments of the invention to decode a protocol of a communication between transponder and reader device for identification purpose. Hence, the transponder detection scheme according to exemplary embodiments of the invention may be much faster and can be carried out with less energy consumption.

However, alternatively, it is also possible that embodiments of the invention combine the determination of a (for instance downward) shift of the frequency with a protocol analysis for a refined presence detection, thereby allowing to further increase the accuracy and the reliability. In such an embodiment, the transponder detection unit may be adapted for detecting the presence of the transponder by additionally performing protocol decoding. Such an additional protocol analysis may further increase the reliability of a frequency shift based determination of the presence of a tag.

The transponder detection unit may be adapted for detecting the presence of the transponder within the operating distance of the reader device by a damping of a resonance curve of the resonant circuit in the presence of the transponder within the operating distance of the reader device. Therefore, since a characteristic damping, i.e. reduction of the amplitude, of the resonance curve may take place in the presence of a transponder, this information may be used simultaneously to further increase the accuracy of the transponder detection.

The transponder detection unit may be adapted for detecting the presence of a transponder by detecting a voltage value at two (or more) different reference frequency values of the resonant circuit and by comparing the voltage value at the two different resonance frequency values. As will be explained below in more detail, such a concept may be realized as a dynamic resonance tuning embodiment or as a frequency variation embodiment, both relying on the sign of a shift of voltage values in the presence of a tag which significantly differs from a characteristics in the absence of a tag, for instance in the presence of a metal piece such as a key.

The transponder detection unit may further be adapted for detecting the presence of a transponder by detecting a peak (such as a maximum or a minimum) of a resonance curve of the resonant circuit. Such a peak detection is a reliable measure for determining a direction of a shift of a resonance frequency due to the presence of a transponder. For example, a voltage controlled oscillator (VCO) may be used for that purpose.

The reader device may be adapted as one of the group consisting of a read and/or write device, an RFID reader, a contactless chip card reader, a passive transponder, and a Near Field Communication device. Also the reader device may be configured in this manner.

The transponder detection unit may be adapted for detecting the shift based on the detection of an amplitude value of the resonance curve at a sample frequency, particularly at the resonance frequency. When a shift takes place due to the presence of a tag, this shift may be measured even without explicitly determining the altered resonance frequency. In contrast to this, benefit may be made of the fact that a shift of the resonance frequency may also result in a change of the amplitude at any fixed frequency, namely a predefined sample or reference frequency.

The term "transponder" may particularly denote an RFID tag or a contactless chip card. More generally, a transponder may be a device (for instance comprising a chip) which may automatically transmit certain (for example coded data) when activated by a special signal from an interrogator.

According to an exemplary embodiment of the invention, a method to detect passive RFID devices in NFC applications is provided to create an integratable system that consumes as little power as possible. By investigating the physical properties of RFID systems, a qualified parameter was figured out: the change of the resonance frequency. According to an exemplary embodiment of the invention, the tag detection is over 160 times faster and hence a lot more economic compared to the usual protocol detection. Advantageously, it is possible to detect non-resonant tags, thereby allowing to distinguish them from tags. According to an exemplary embodiment of the invention, tags can be detected by using the conventional protocol based query once in a while during operation. Exemplary embodiments of the invention may provide for a passive transponder detection for NFC Systems.

According to an exemplary embodiment of the invention, a new approach is provided for detecting the presence of near field communication tags. A corresponding method does not rely at all (or does not rely only) on trying to decode the protocol but uses physical properties of the coupled coils instead. When compared with other approaches, exemplary embodiments of the invention consume a lot less power and are faster. According to an exemplary embodiment of the invention, an extremely power efficient method for active near field communication (NFC) devices is provided to detect nearby passive radio frequency identification (RFID) transponders for NFC applications. Such an approach may cut a detection time down to approximately 30 μs by evaluating the shift of the transmitter antennas resonance frequency due to the presence of a tag antenna. The tracking of tags or the detection of active transponders may be possible as well.

According to an exemplary embodiment of the invention, the influence of both tag antennas and other metallic objects on the transmitter may be analyzed in detail analytically and experimentally. It is possible to exploit these physical effects for a fast and low power detection method for passive NFC devices. Such a method may also be applied to FPGA based systems.

The communication between different components of the device or between the device and further devices may be carried out in a wired manner (for instance using a cable) or in a wireless manner (for instance via a WLAN, infrared communication or Bluetooth).

The aspects defined above and further aspects of the invention are apparent from the examples of embodiment to be described hereinafter and are explained with reference to these examples of embodiment.

The invention will be described in more detail hereinafter with reference to examples of embodiment but to which the invention is not limited.

The illustration in the drawing is schematically. In different drawings, similar or identical elements are provided with the same reference signs.

FIG. 1 illustrates a communication system 100 according to an exemplary embodiment of the invention.

The communication system 100 comprises a reader device 110 for detecting the presence of a transponder 120 within an operating distance 130 of the reader device 110. Within this operating distance 130, the transponder 120 is located.

Figure 1:
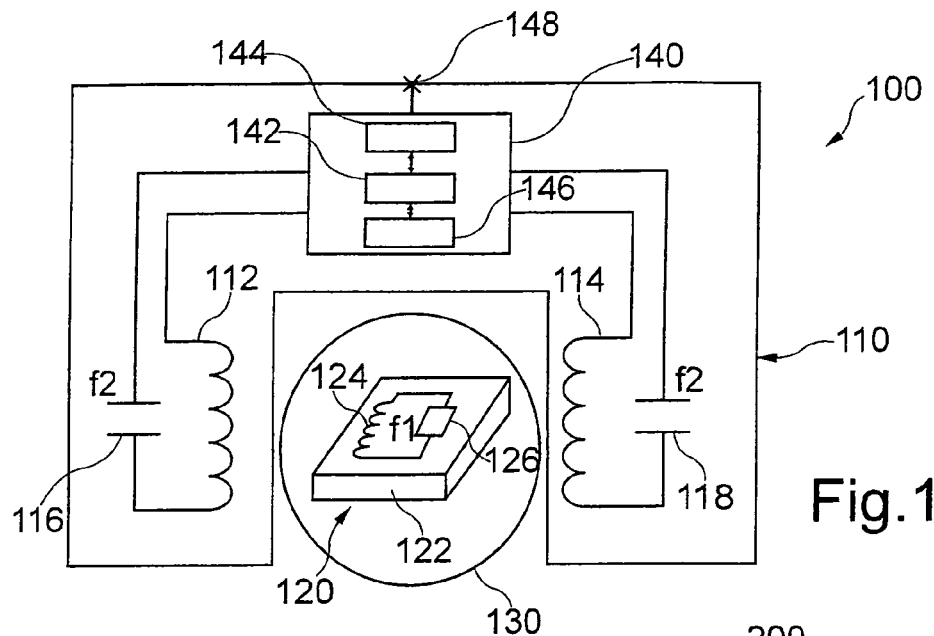
FIG. 1 illustrates a communication system according to an exemplary embodiment of the invention.

The transponder 120 comprises a substrate 122 which may be a fabric on which an integrated circuit 126 is arranged. As can further be taken from FIG. 1, the transponder 120 comprises a transmission coil 124 which is coupled to the IC chip 126. The IC chip 126 comprises a number of integrated circuit components, for instance a processor, a memory, etc. The transponder 120 may operate at a resonance frequency $f_1$.

The reader device 110 is adapted for detecting the presence of the transponder 120 within the operating distance 130 of the reader device 110. The reader device 110 comprises a resonant circuit which is formed in the shown embodiment by inductance coils 112, 114 and capacitors 116, 118. The resonant circuit resulting from the circuitry of components 112, 114, 116, 118 is adapted for generating an electromagnetic field having a narrow-band frequency distribution around a resonance frequency $f_2$.

The resonance frequency $f_1$ of the transponder 120 differs from the resonance frequency $f_2$ of the reader device 110, particularly $f_1 > f_2$.

The reader device 110 further comprises a control unit 140 which may be a processor such as a microprocessor or a central processing unit (CPU). The control unit 140 comprises a synchronizing unit 142 for synchronizing operation of an impedance matching circuit 142 for matching the impedance of the resonant circuit 112, 114, 116, 118 and the function of a transponder detection unit 146. The transponder detection unit 146 is adapted for detecting the presence of the transponder 120 within the operating distance 130 of the reader device 110 upon recognition of a downward shift of the resonance frequency $f_2$ of the resonant circuit 112, 114, 116, 118 in the presence of the transponder 120 within the operating distance 130 of the reader device.

Namely, the present inventors have surprisingly recognized that the resonance frequency of a resonant circuit 112, 114, 116, 118 is selectively and reproducibly reduced in the presence of a transponder 120. This event can be perceived by the transponder detection unit 146 and can be output via a user interface 148 such as a wireless interface providing information regarding the transponder 120 to be output to a human operator.

Apart from securely determining the presence of a transponder 120, the transponder detection unit 146 can also determine the absence of a transponder 120 within the operating distance 130 of the reader device 110 by an upward shift of the resonance frequency $f_2$ of the resonant circuit 112, 114, 116, 118 in the presence of a metal object such as a key within the operating distance 130 of the reader device 110. Therefore, when a metal object such as a key is present within or enters the operating distance 130, this event can be detected by an upward shift of the resonance frequency $f_2$ of the resonant circuit 112, 114, 116, 118 and can therefore be clearly distinguished from the presence of a transponder 120 resulting in a downward shift of the resonance frequency $f_2$ of the resonant circuit 112, 114, 116, 118.

Apart from qualitatively (or "digitally") distinguishing between the presence and absence of a transponder 120, the transponder detection unit 146 is further adapted for quantitatively determining a distance between the transponder 120 and the reader device 110 (or in other words a position of the transponder 120 within the operating range 130) by evaluating an extent of the downward shift of the resonance frequency $f_2$. As can be taken from FIG. 2 which will be explained below in more detail, the quantity of the shift $f_2$ depends on the distance/position.

Therefore, the transponder detection unit 146 is adapted for detecting the presence of the transponder 120 without performing protocol decoding, i.e. without decrypting a message received from the transponder 120 for determining the presence of the transponder 120.

In addition to the frequency shift, also an amplitude shift may be evaluated to improve the reliability regarding the presence of the transponder 120.

For example, it is possible to detect a peak of a resonance curve of the resonant circuit 112, 114, 116, 118. This maximum value may be compared to a maximum value of the resonance curve without the presence of the transponder 120.

Next, a functional principal according to an exemplary embodiment of the invention will be explained, based on coupled resonant antennas.

A conventional RFID reader hardware comprises an oscillator generating the carrier frequency and a loop antenna. For near field communication the carrier is modulated according to ISO 18092. Loop antennas used for NFC enclose an area of approximately 30 cm². The antenna together with a capacitor acts as a resonant circuit which is coupled via a matching network to the oscillator. The antenna circuit is tuned to the transmission frequency of the system (13.56 MHz) and has a quality factor of about 15. The resulting antenna voltage reaches approximately 35V (less than 50V due to filtering loss). The receiving antenna of a tag is a resonant circuit to be composed of a loop antenna, a capacitor and circuitry for load modulation. A tag may be tuned to a frequency between 14 MHz and 18 MHz. Having such a tag close to the RWD antenna results in a downward shift of the reader antennas resonant frequency. Its this frequency shift which is exploited for a tag detection procedure according to an exemplary embodiment of the invention.

In the following, a theoretic model of coupled resonant antennas will be explained.

The below system of equations (1) describes the interaction of an RWD device with a tag, wherein u denotes a voltage, i denotes a current, t denotes the time, L denotes an inductance, and M denotes a mutual inductance.

When the tag is outside the range of the reader, the mutual inductance M is practically zero. Bringing the tag into close proximity of the reader increases the mutual inductance M because of magnetic coupling.

$$u_1(t) + L_1 \frac{di_1(t)}{dt} + M \frac{di_2(t)}{dt} = 0 \qquad (1)$$
$$u_2(t) + L_2 \frac{di_2(t)}{dt} + M \frac{di_1(t)}{dt} = 0$$

By solving the differential equations, the eigenvalues are obtained which lead to the following result for the resonance frequencies:

$$f_{1,2} = \frac{1}{\sqrt{2}\pi} \sqrt{\frac{C_1 L_1 + C_2 L_2 \pm \sqrt{(C_1 L_1 - C_2 L_2)^2 + C_1 C_2 M^2}}{4 C_1 L_1 C_2 L_2 - C_1 C_2 M^2}}$$

Figure 2:
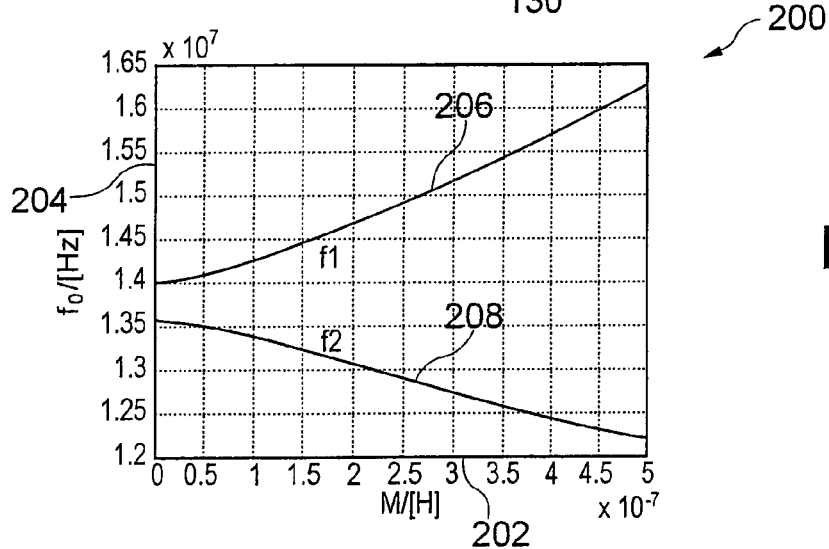
FIG. 2 is a diagram illustrating a dependency of a resonance frequency of a reader device and of a transponder from a mutual inductance.

FIG. 2 is a diagram 200 having an abscissa 202 along which a mutual inductance M between reader device 110 and transponder 120 is plotted, whereas a resonance frequency $f_0$ (which can be $f_1$ or $f_2$) is plotted along an ordinate 204 of the diagram 200. A first curve 206 illustrates the resonance frequency shift $f_1$ of the transponder 120, whereas a second curve 208 illustrates a frequency shift $f_2$ of the reader device 110.

In FIG. 2, a reader is modeled with a resonance frequency of 13.56 MHz and a tag is modeled with a resonance frequency of 14 MHz. With increasing mutual inductance M, the reader's resonance frequency $f_2$ drops and the tags resonance frequency $f_1$ increases. Solid metal objects within the magnetic near field increase the resonance frequency.

In consequence of induced eddy currents, the mutual inductance reduces the effective inductivity of the resonant circuit.

In the following, the mutual inductance will be estimated.

Next, the results above will be verified with several tags. The mutual inductance cannot be measured easily. Instead, Ms dependencies on tag geometry and reading distance are estimated, to derive the reader's frequency shift. By estimating the area for the coupled magnetic flux (depending on the distance and the antenna sizes) advantage can be taken of Biot-Savart's law to calculate the average coupled magnetic flow.

Figure 3:
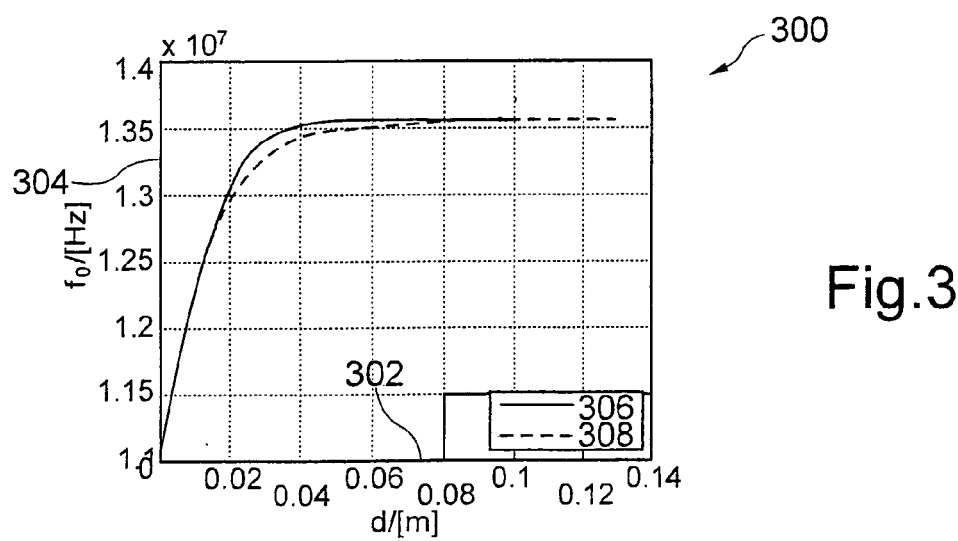
FIG. 3 is a diagram illustrating a dependency of a resonance frequency over a reading distance.

FIG. 3 is a diagram 300 having an abscissa 302 along which a distance d is plotted in meters. Along an ordinate 304, a resonance frequency $f_0$ is plotted. A first curve 306 shows a model, and a second curve 308 shows a measurement.

In FIG. 3, the theoretical model of the reader resonance is compared with data derived experimentally. Typically, the theoretical model fits the measured data very closely.

The mathematic model may be verified by measuring the scattering parameter (S-parameter) S11 of the system. The S-parameter analyzer delivered the magnetic field over a Rohde & Schwarz HZ-11 loop antenna to stimulate the reader antenna and a nearby tag. Evaluating the reflected power (via the same HZ-11 loop), the shift of the resonance peaks was determined.

To see if the system satisfies the real world, some measurements were performed. The idea was to use a sense coil to measure the S-parameters of the reader field. The change of resonance at the reader side was of interest. So a two windings loop antenna was constructed with 5 cm of diameter. It was brought to a certain distance below the reader antenna. It has to be close enough to see a clear result of the behavior, and on the other hand far enough away to eliminate retroactive effects. The result was a stack of synthetic plates acting as spacers.

To see what might happen in daily use of NFC devices, a variety of objects were compiled that are likely to emerge within the reader field. Some of them will be show in the following.

Figure 4:
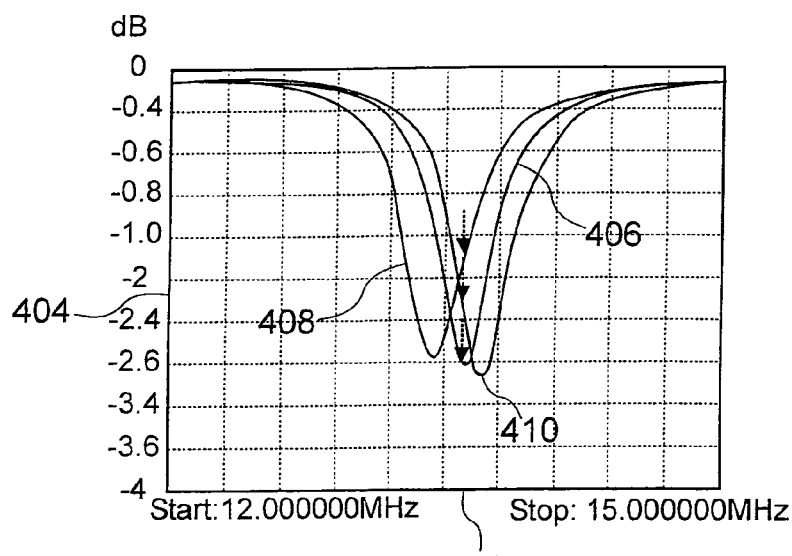
FIG. 4 is a diagram showing a comparison of resonance curves obtained in the absence of any element, in the presence of a tag or in the presence of keys.

Following objects were placed 2 cm above the NFC reader antenna:
  a passive RFID device
  a bunch of keys
  many different metal objects of different sizes
  ferrites FIG. 4 is a diagram 400 having an abscissa 402 along which a frequency is plotted and having an ordinate 404 along which an amplitude is plotted in dB. A first curve 406 relates to no substance in an operating range 130, a second 408 relates to a transponder 120 in an operating range 130, and a third curve 410 relates to keys present in the operating range 130.

The middle curve 406 in FIG. 4 shows the resonance peak of the reader antenna without influencing objects. When a passive transponder is moved into the field, the resonance is shifted to the left. The bunch of keys shifts the resonance to the opposite direction. The markers highlight the magnitude values at the nominal resonance frequency at 13.56 MHz. In both cases the magnitude is damped, even if the real maximum is larger.

Next, extended tests of materials will be explained.

Figure 5:
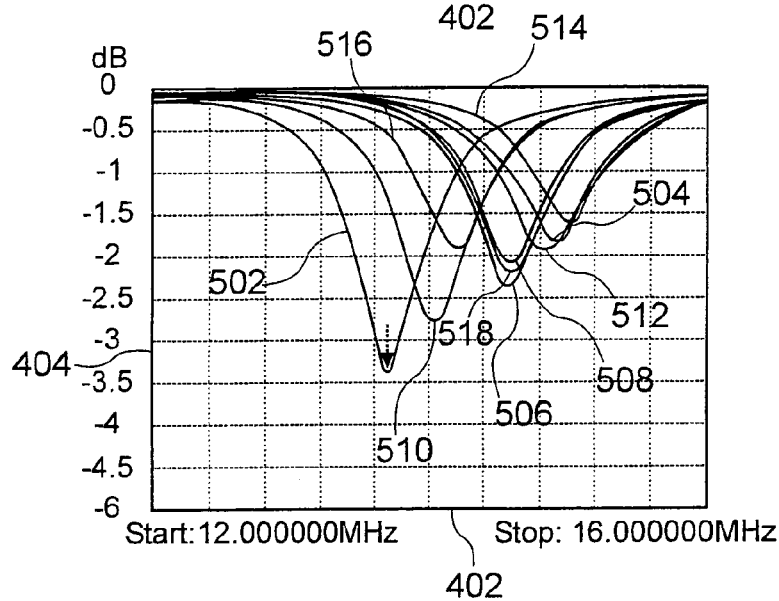
FIG. 5 is a diagram illustrating an influence of materials, namely metal objects.

To get a feeling about the strength of influence different metal materials could have, several tests were performed. FIG. 5 shows the results.

FIG. 5 shows a diagram 500 similar to FIG. 4 and relating to no substance measurement 502, a stainless steel plate measurement 504, an aluminium profile measurement 506, a printed circuit board (PCB) measurement 508, a copper pipe measurement 510, a brass plate measurement 518, an aluminium plate measurement 514, a brass profile measurement 516, and an iron measurement 512.

Curve 502 shows the nominal (uninfluenced) curve. It can be said, that every metal object has a significant impact and trends to the same behavior, of course.

In the next step it shall be verified how other materials like ferrites behave.

Figure 6:
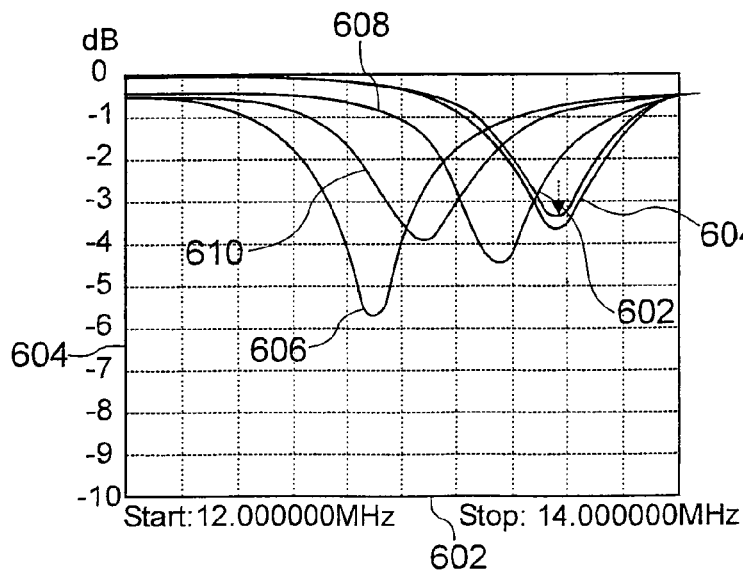
FIG. 6 is a diagram illustrating an influence of materials, namely ferrites, a human body, and a tag.

FIG. 6 is a diagram 600 similar to the diagrams 400 and 500 and shows a no substance measurement 602, a hand measurement 604, a ferrite plate 606, a ferrite toroid measurement 608 and a tag measurement 610.

The curve 602 depicts the original behavior again. This test is interesting even if ferrites usually do not appear too often in out daily life. FIG. 6 shows that ferrites show a similar behavior like tags. Hence they can be used to ensure tag detection.

A further test object was the human body. Moving the hand around the device does not shift the resonance, it only varies the magnitude slightly.

Also other parameters (for instance turn-on time, phase shift, current consumption, etc.) of the antenna circuit have been tested.

The frame of tag detection is made up of the terms low-cost and low-effort that leads to low-cost again.

The big majority of passive RFID devices uses resonant circuits to increase the supply voltage provided by the magnetic field. Further nearly all of these circuits are matched to resonance far above the carrier frequency of 13.56 MHz. They usually range from approximately 14 MHz up to 18 MHz. This makes it possible to allege the following statement. Inductively coupling of tags with reader antennas (which are usually matched quite precisely to the carrier frequency) shifts the main resonance frequency of the reader antenna towards lower frequencies. This is a very important basis. Relying on this knowledge and the awareness of the measurement results from above, it is already possible to derive a tag detection method. This is particularly reliable upon the use of resonant tags with a resonance frequency higher than the one of the RWD antenna.

Metal objects could compensate the influence of tags partially. However, it is quite hard to operate tags in the near proximity of metal objects. Thus this case shall be considered as unwise use of RFID systems. Ferrites and tags behave quite alike. So if ferrites come to the close proximity of NFC devices that evaluate a resonance curve similar to that for tag detection.

Again a look at the application scenario clarifies that this is not practical. NFC devices with a low power detection method may be built in into handheld consumer electronic devices. Since it is not usual to carry around ferrites and also daily life objects are made up of other materials this matter should not matter. The only thinkable ferrite could occur in connection with tags mounted near metals. In this case it even helps to detect them.

Next, a passive target detection system will be explained.

As described above, it is possible to derive information about the presence of tags from the shift of the reader's resonance frequency. Some methods will be presented in the following how this knowledge can be exploited.

It may be sufficient to consider only the change of the resonance frequency. Of course, also the magnitude is influenced and can be considered additionally.

In the following, a dynamic resonance tuning system will be explained. One embodiment is to put the antenna resonance out of tune. This can be done by disconnecting a capacitor of the matching circuit. It is preferred to perform a shift to a higher resonance frequency. Two measurements have to be performed in such an embodiment. First the 13.56 MHz carrier voltage is measured when the antenna is matched. After putting the antenna out of tune the same carrier is applied and measured again. If the first voltage was larger than the second one, no tag is present. If the second measurement was larger, a tag was detected.

Figure 7:
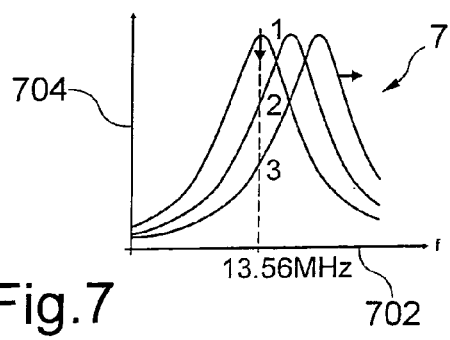
FIG. 7 and FIG. 8 illustrate diagrams showing a tag detection scheme according to an exemplary embodiment of the invention by dynamic resonance tuning.

FIG. 7 is a diagram 700 having an abscissa 702 along which a frequency is plotted and having an ordinate 704 along which an amplitude is plotted and showing first to third curves referring to a dynamic resonance tuning method in the absence of a tag.

Figure 8:
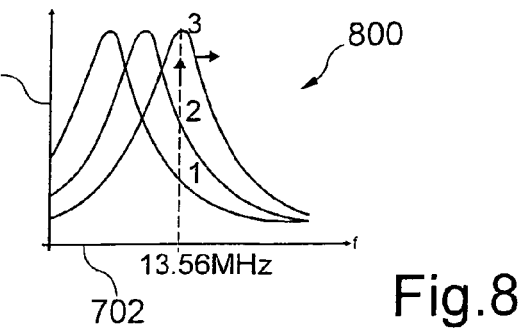

FIG. 8 is a diagram 800 similar to the diagram of FIG. 7 in the presence of a tag.

FIG. 7 and FIG. 8 show two different cases. Starting with FIG. 7, the situation when no tag is available can be discussed. The resonance will be one of two cases. Either it is not mismatched and hence tuned to nominal resonance of 13.56 MHz. Or it is influenced by metal objects. In this case it will increase its resonance frequency. Anyway, a 13.56 MHz carrier is applied and the antenna voltage is measured at this frequency. In the second step, the resonance frequency of the circuit is increased for instance by disconnecting some capacitances. Again, the antenna voltage is measured when the same carrier is applied. The measured voltages will decrease.

Turning to the second case, one may imagine a tag is nearby. Then the resonance will look like the black and the two graphs shown on the left hand side of FIG. 7. A carrier is applied to this system and the voltage is measured. Again, the resonance frequency of the circuit is increased like described above, and it is measured again. In this case, the voltage values will increase. Toggling the connection of capacitors may be difficult when high frequent signals are used.

Next, an embodiment denoted as a frequency variation system will be explained.

Figure 9:
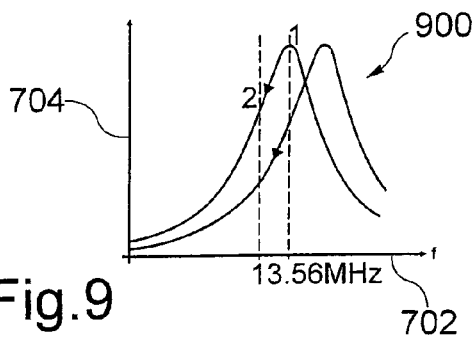
FIG. 9 and FIG. 10 show diagrams for a tag detection according to an exemplary embodiment of the invention in accordance with a frequency variation scheme.
Figure 10:
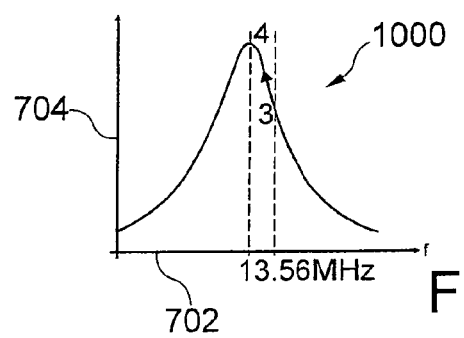

FIG. 9 and FIG. 10 are diagrams 900, 1000 corresponding to FIG. 7 and FIG. 8, respectively, in the context of a frequency variation detection scheme with a tag (FIG. 10) and without a tag (FIG. 9).

A variant of the dynamic resonance tuning is to vary the frequency. Sampling two different magnitude values of the resonance curve gives also clear information about the mismatch of the circuitry. One test frequency is the carrier frequency. The second one has to be smaller. The amount of deviation from the nominal carrier frequency depends on the quality factor of the antenna system. The higher the quality factor, the lower the deviation.

FIG. 9 shows the situation for no available tag or even metal disturbances. When applying a 13.56 MHz carrier and measuring the antenna voltage, for instance sample value 1 is obtained. When the frequency is lowered slightly and the voltage is measured again, sample value 2 is obtained. One can see that the values are decreasing.

In opposite when doing the same thing when a passive transponder is in the neighborhood, see FIG. 10, one can see that point 3 at 13.56 MHz is lower than point 4 at a lower frequency. Hence the values are increasing.

This version might be even easier to implement if the resonator can be modified (for instance digitally by the use of a delay locked loop, DLL).

Another embodiment is to search for the peak value of the resonance curve. A voltage controlled oscillator (VCO), also used for the carrier generation, can be used to sweep the frequency until the antenna voltage reaches a peak value. The control voltage of the VCO gives detailed information about the resonance shift. It can even be used to estimate how far away the tag could be.

For an implementation in hardware, it is possible to use a programmable hardware chip (FPGA) to have something behaving similar like an integrated circuit. This FPGA system can be a Xilinx Spartan-3 Starter Kit. A goal was to implement a neighborhood detection with standard design tools and see how much hardware will be needed. Further it was interesting to see how fast and how sensitive this detection can be.

The Spartan-3 contains DCM (digital clock manager) units. These can be used to modify clocks with very low jitter. Hence it is possible to implement the frequency variation method described above. To have a suitable clock, a 27.12 MHz oscillator may be connected to the external clock input of the Starter Kit. Antenna and antenna matching circuit were taken from a NXP7 NFC development kit. The only change made was to exchange the old transmitter with the Spartan-3 board and to add a peak value detection circuit.

A corresponding concept comprises two modules called transmitter and receiver. A central controller unit controls both modules.

Figure 11:
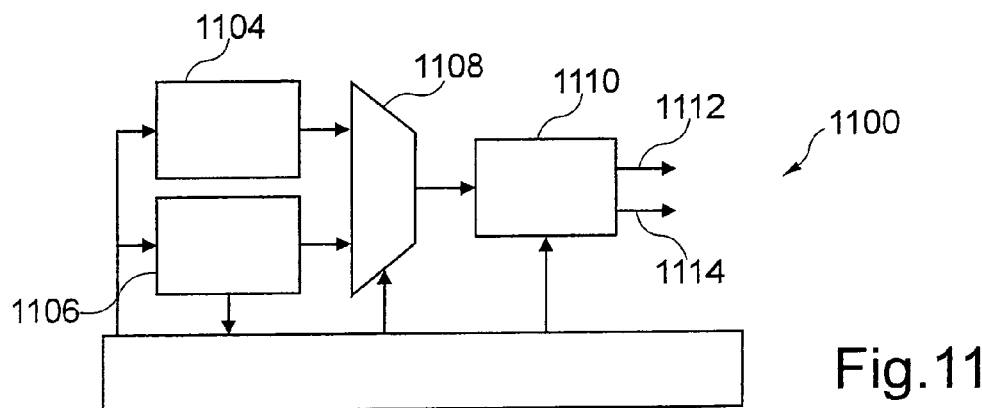
FIG. 11 illustrates a transmitter as a model for a transducer.

FIG. 11 illustrates a transmitter path 1100 having a controller 1102, a first clock generator 1104 for generating a clock frequency of 13.50 MHz, a second clock generator 1106 generating a clock at a frequency of 13.56 MHz, a multiplexer 1108, and a differential output buffer 1110 having a positive output 1112 and a negative output 1114.

Figure 12:
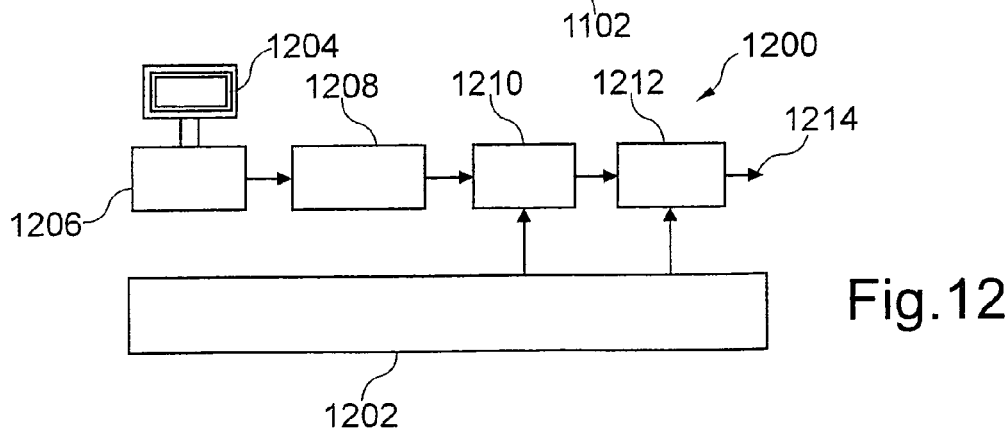
FIG. 12 shows a receiver as an example for a reader device according to an exemplary embodiment of the invention.

FIG. 12 illustrates a receiver path 1200 having a controller 1202, an antenna 1204, an antenna control 1206, a peak detector 1208, an ADC (analog-to-digital converter) 1210, an evaluation unit 1212 and a tag present/absent signal output 1214.

FIG. 11 shows the basic structure of the transmitter 1100. Its purpose is to provide the carrier frequencies for the antenna circuit. The receiver 1200 is shown in FIG. 12. The blocks shown in this figure are mixed analogue and digital.

The transmitter circuit is purely digital. It has a controller 1102 that manages two DCM units 1104, 1106, a multiplexer 1108 and a single-ended to pseudo-differential output 1110.

Generation of the first carrier signal with 13.56 MHz is done by just buffering the input signal of 27.12 MHz. This happen within the first DCM 1104. The division by 2 happens later in the single-ended to differential block 1110. For the second carrier generation, the DCMs 1104, 1106 were cascaded. Thus it was possible to vary the frequency in very small steps. The first one increases the frequency from 27.12 MHz to 27.995 MHz. The second one steps the frequency down again from 27.995 MHz to 26.995 MHz. Later, in the single-ended to differential block 1110 this frequency is divided by 2 what results in 13.498 MHz. It has a deviation from the nominal value of approximately 50 kHz.

The multiplexer (MUX) 1108 is an asynchronous device. It feeds one of the carrier frequencies through. If no signal is needed, the output is high impedant.

A differential output buffer 1112 shapes the output signal. This unit converts the single-ended input signal to a pseudo-differential output signal. By the use of this block 1112 it is possible to achieve an output signal twice as big as a single-ended signal could have. Secondly the antenna circuit was constructed to handle such signals. Implementation of this block is rather critical. There should be no delay between the positive output 1112 and the negative output 1114. Note that by virtue of the implementation this block divides the input carrier frequencies by two.

In contrast to the transmitter 1100, the receiver 1200 implementation comprises external analogue and internal digital components. Outside the Spartan-3 there are an antenna circuit 1206 with a peak detector 1208 and an analogue to digital converter (ADC) 1210. The sampled values of the analogue part are then digitally evaluated inside the FPGA 1212. This gives a high grade of flexibility for performance tuning.

In FIG. 12, the antenna 1206 and the peak detector 1208 are drawn as separate blocks. From a logic point of view this is correct. However, in hardware the peak detector 1208 is integrated to the antenna matching circuit. There may be an interaction of the peak detector 1208 and the antenna matching. Merging both circuits to a small design brings satisfying results.

One frame condition was to use a slow ADC 1210. That means, it provides a sample and hold device. Thus, the moment of sampling is clearly determined. But the conversion of the sampled value may take some time. This should save power. Moreover it reduces the effort on chip. If there are many samples they have to be evaluated, of course. This takes memory, additional logic gates and high frequent computations. An idea was to just sample the approximate peak value (therefore the peak detector) of the antenna voltage. To determine the presence of a tag this information is exactly what is needed. Per frequency one peak value is being sampled.

Evaluation of the sampled values happens by just comparing the samples to each other. There is no absolute threshold. The sampled values may be related to each other. Absolute values are only used for further validation checks. Finally a signal is received telling if there is a tag or not.

Figure 13:
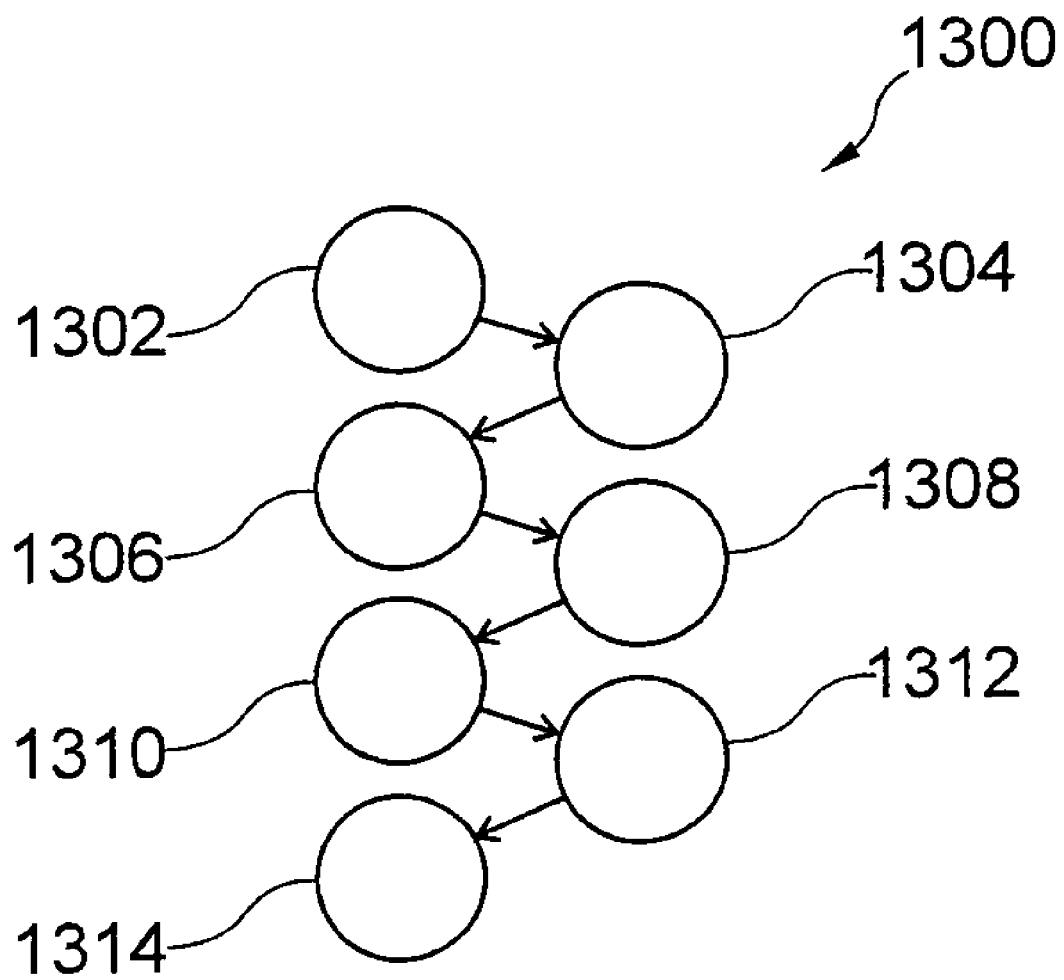
FIG. 13 illustrates a controller state machine.

Both transmitter and receiver are controlled by a central state machine 1300 like drafted in FIG. 13.

FIG. 13 shows the controller state machine 1300 having a power on block 1302, a use 13.56 MHz block 1304, a sample block 1306, a use 13.50 MHz block 1308, a sample block 1310, an evaluate block 1312 and a power off block 1314.

This controller generates the timing for the system. It starts by powering 1300 the device on. The first measurement 1302 is done with the 13.56 MHz carrier. Meanwhile the DCMs for the carrier generation of 13.50 MHz have time to lock. After a predetermined period the peak value of the antenna voltage is sampled 1306 and converted. While conversion the field is turned off again. In the next step the 13.50 MHz carrier is enabled 1308.

After the same settling time as before a peak voltage value is sampled 1310 and converted. During conversion the field is turned off and the DCMs can be disabled again. Finally the sampled values are evaluated 1312 and the system returns to power off state 1314.

Regarding hardware effort and performance, there are two major questions: how many hardware did it take and how long does the detection last. Regarding the hardware effort, the synthesis tool with default settings and no special optimization summarized the used hardware as follows:

| | |
|---|---|
| Number of slices | 76 |
| Number of Slice Flip Flops | 79 |
| Number of 4 input LUTs | 115 |
| Number of GCLKs | 6 |
| Number of DCMs | 2 |

Of course there is still potential to reduce this further. Especially the carrier generation demands dedicated hardware. However, it shows that with a total of a lot less than 100 flip-flops and some gates the whole digital unit can be built. The analogue effort is rather small since an ADC is needed anyway to read the tag response. The only additional analogue effort is found in the peak detector that consisted of 4 components.

The whole turn-on period including settling and conversion time add up to 30 μs. This complies to approximately 130 cycles per carrier frequency. The shortest possible communication based tag detection pales in comparison with 5 ms. The proposed solution is over 160 times faster.

For clock generation, it is possible to use an independent internal clock with a high-grade power management.

It should be noted that the term "comprising" does not exclude other elements or features and the "a" or "an" does not exclude a plurality. Also elements described in association with different embodiments may be combined.

It should also be noted that reference signs in the claims shall not be construed as limiting the scope of the claims.

The invention claimed is:

1. A reader device for detecting the presence of a transponder within an operating distance of the reader device, the reader device comprising
   a resonant circuit configured to generate an electromagnetic field having a frequency distribution around a resonance frequency;
   a transponder detection unit configured to detect the presence of the transponder within the operating distance of the reader device both by a downward shift of the resonance frequency of the resonant circuit, and by a damping of a resonance curve of the resonant circuit, in the presence of the transponder within the operating distance of the reader device; and
   wherein the transponder detection unit is configured to determine the absence of a transponder within the operating distance of the reader device by an upward shift of the resonance frequency of the resonant circuit in the presence of a metal object within the operating distance of the reader device.

2. The reader device according to claim 1, wherein the transponder detection unit is configured to determine a spatial distance between the transponder and the reader device by evaluating a quantity of the downward shift of the resonance frequency.

3. The reader device according to claim 1, wherein the resonant circuit is configured to generate the electromagnetic field having a frequency distribution around a resonance frequency which is smaller than a resonance frequency of a transponder to be detected.

4. The reader device according to claim 1, wherein the resonant circuit is configured to generate the electromagnetic field having a frequency distribution around a resonance frequency which is approximately 13.56 MHz.

5. The reader device according to claim 1, wherein the transponder detection unit is configured to detect the presence of the transponder without performing protocol decoding.

6. The reader device according to claim 1, wherein the transponder detection unit is configured to detect the presence of the transponder by additionally performing protocol decoding.

7. The reader device according to claim 1, wherein the transponder detection unit is configured to detect the presence of a transponder by detecting a voltage value at two different reference frequency values of the resonant circuit and by comparing the voltage value at the two different reference frequency values.

8. The reader device according to claim 1, wherein the transponder detection unit is configured to detect the presence of a transponder by detecting a position of a peak of a resonance curve of the resonant circuit.

9. The reader device according to claim 1, wherein the reader device is at least one of an RFID reader, a contactless chip card reader, a passive transponder, and a Near Field Communication device.

10. The reader device according to claim 1, wherein the transponder detection unit is configured to detect the shift based on the detection of an amplitude value of the resonance curve at a sample frequency.

11. A communication system, comprising
    a reader device of claim 1 for detecting the presence of a transponder within an operating distance of the reader device; and
    a transponder arrangeable within the operating distance of the reader device.

12. The communication system according to claim 11, wherein the reader device is at least one of an RFID reader, a contactless chip card reader, and a Near Field Communication device, and wherein the transponder is at least one of a RFID transponder, a contactless chip card, a passive transponder, and a Near Field Communication device.

13. A method of detecting the presence of a transponder, the method comprising
    generating an electromagnetic field having a frequency distribution around a resonance frequency;
    detecting the presence of the transponder both by a shift of the resonance frequency, and by a damping of a resonance curve of the resonant circuit, in the presence of the transponder; and
    determining the absence of the transponder by an upward shift of the resonance frequency at the presence of a metal object.

14. A computer-readable medium, in which a computer program for detecting the presence of a transponder is stored, which computer program, when being executed by a processor, carries out the method according to claim 13.

15. A program element of detecting the presence of a transponder, which program element, when being executed by a processor, carries out the method according to claim 13.

* * * * *